United States Patent [19]

Brown

[11] Patent Number: 5,025,352

[45] Date of Patent: Jun. 18, 1991

[54] LIGHTED GRAB HANDLES FOR TRUCKS

[76] Inventor: Thomas H. Brown, 716 W. Bogart Rd., Sandusky, Ohio 44870

[21] Appl. No.: 536,361

[22] Filed: Jun. 11, 1990

[51] Int. Cl.$^5$ .............................................. B60Q 1/32
[52] U.S. Cl. ..................................... 362/83.3; 362/61; 362/80; 362/211; 362/234
[58] Field of Search .................... 362/80, 83.3, 81, 61; 340/431, 472, 475, 434, 473

[56] References Cited

U.S. PATENT DOCUMENTS

| | | | |
|---|---|---|---|
| 1,291,625 | 1/1919 | Palmer | 362/61 |
| 1,736,616 | 11/1929 | Miller | 362/81 |
| 2,654,877 | 10/1953 | Sparaco | 362/83.3 |
| 2,760,050 | 8/1956 | Porsche | 362/80 |
| 2,844,810 | 7/1958 | Steele, Jr. | 362/80 |
| 3,108,277 | 10/1963 | Thomas | 362/80 |
| 4,839,776 | 6/1989 | Grossnickle | 362/80 |

FOREIGN PATENT DOCUMENTS

| | | | |
|---|---|---|---|
| 1132275 | 3/1957 | France | 362/80 |
| 277469 | 9/1930 | Italy | 362/61 |

Primary Examiner—Ira S. Lazarus
Assistant Examiner—Y. Quach
Attorney, Agent, or Firm—Biebel & French

[57] ABSTRACT

A grab handle for use on motor vehicles is provided comprising a generally vertically extending gripping portion, means for attaching the gripping portion to the side of a motor vehicle, and lamp means in at least one end of the handle for indicating the position of the vehicle. Preferably a pair of lamps are provided, one in each end of the gripping portion, with each of the lamps having a pair of filaments. Means are provided for connecting one of each of the lamp filaments to the electrical circuitry used to supply current to the vehicle's running lamps, and means are also provided for connecting the other of the lamp filaments to the electrical circuitry used to supply current to the vehicle's turn signals.

17 Claims, 3 Drawing Sheets

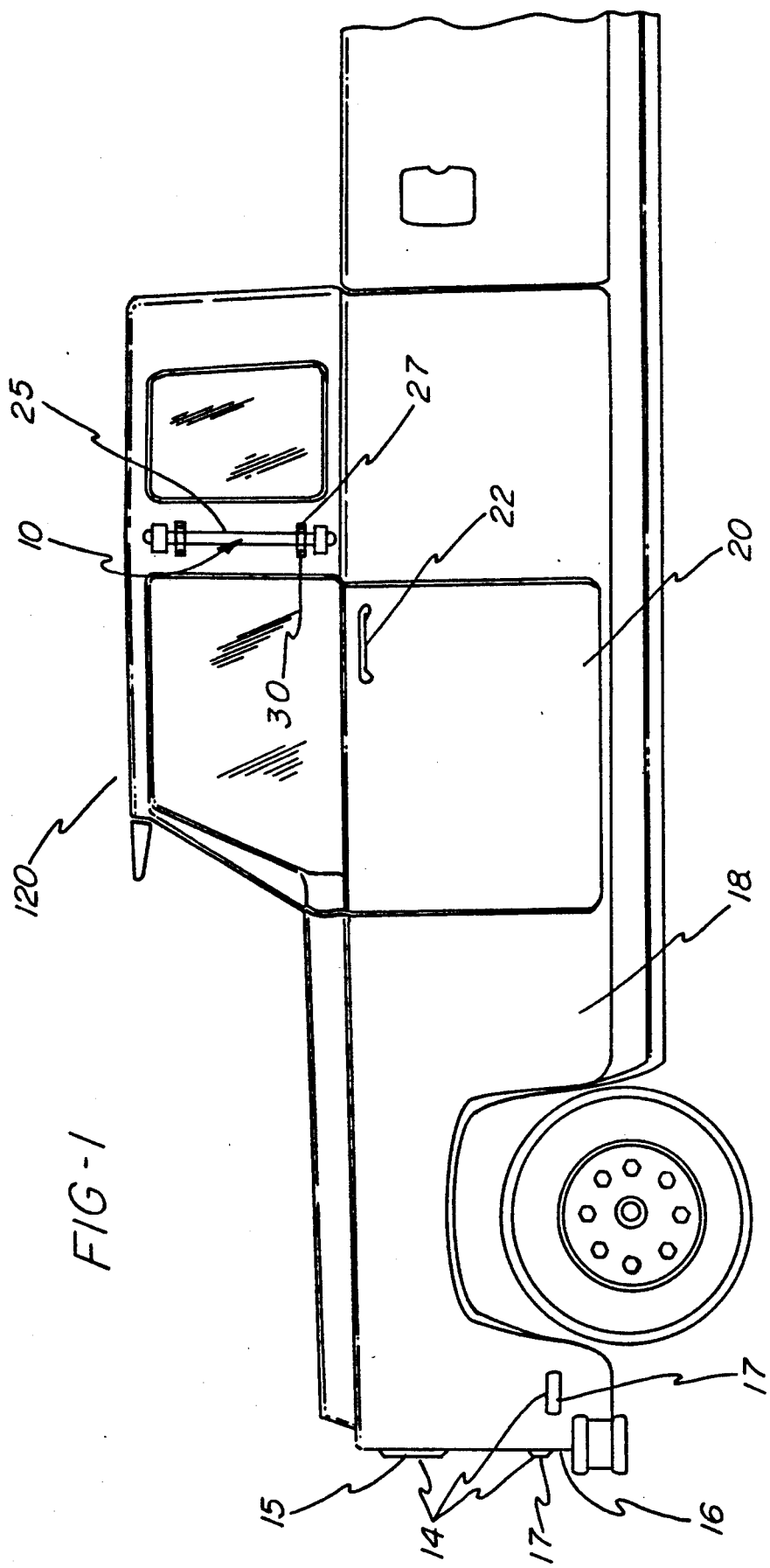

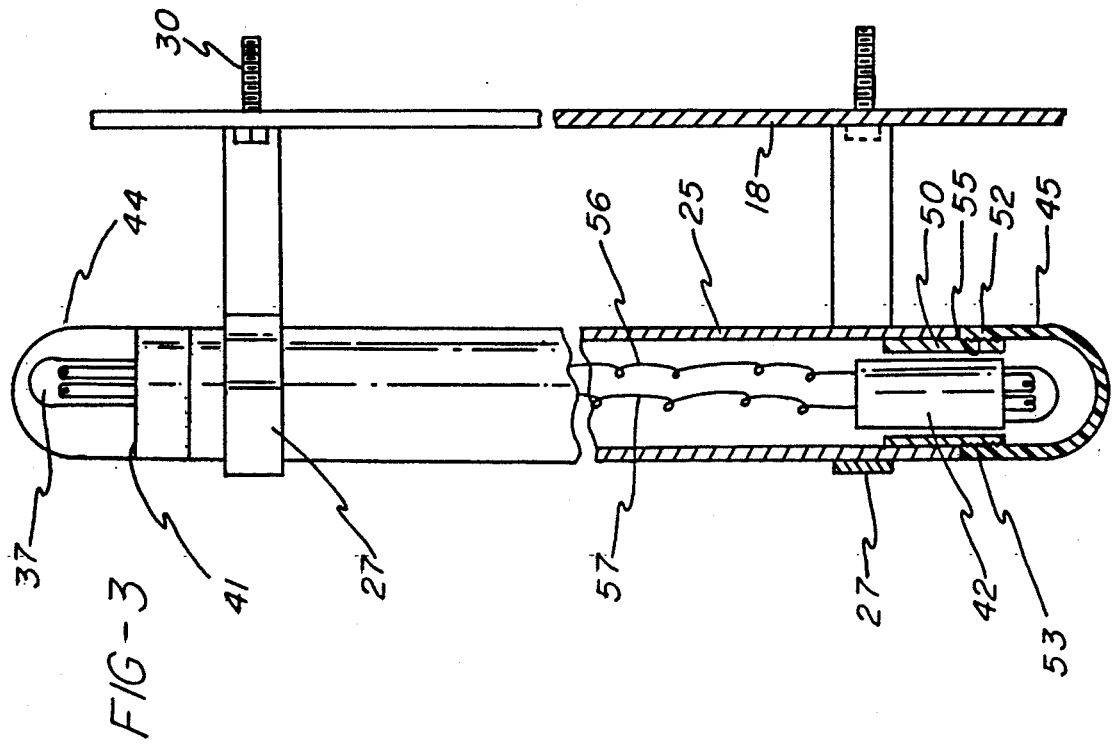
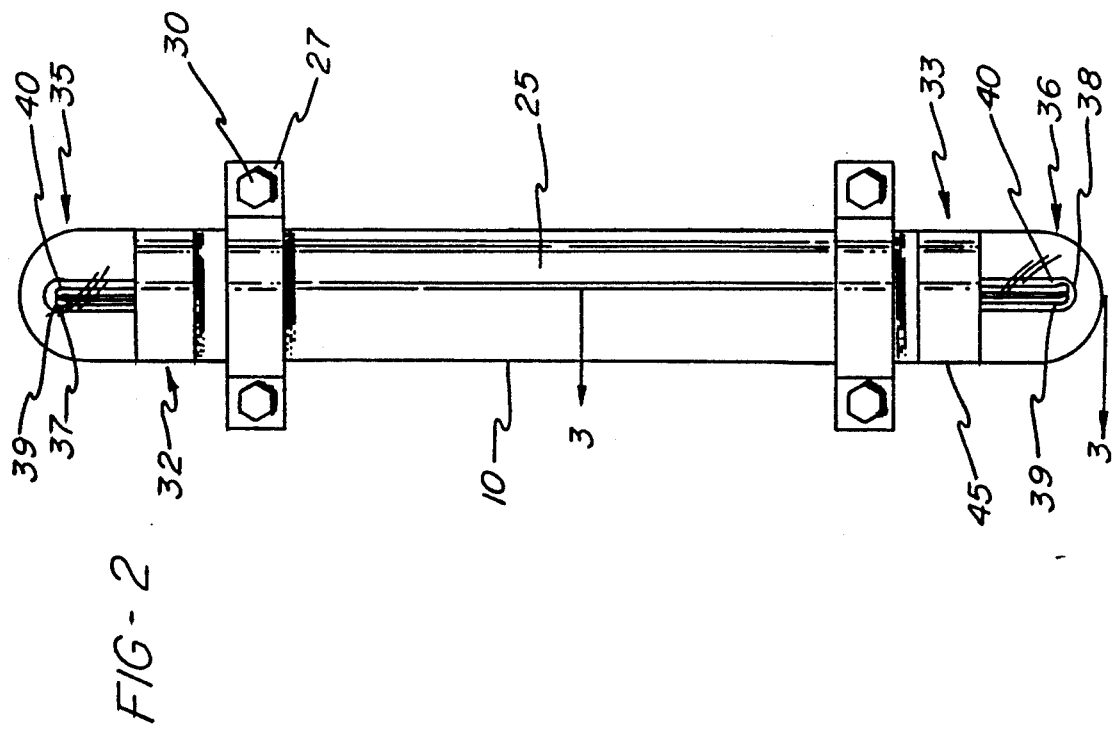

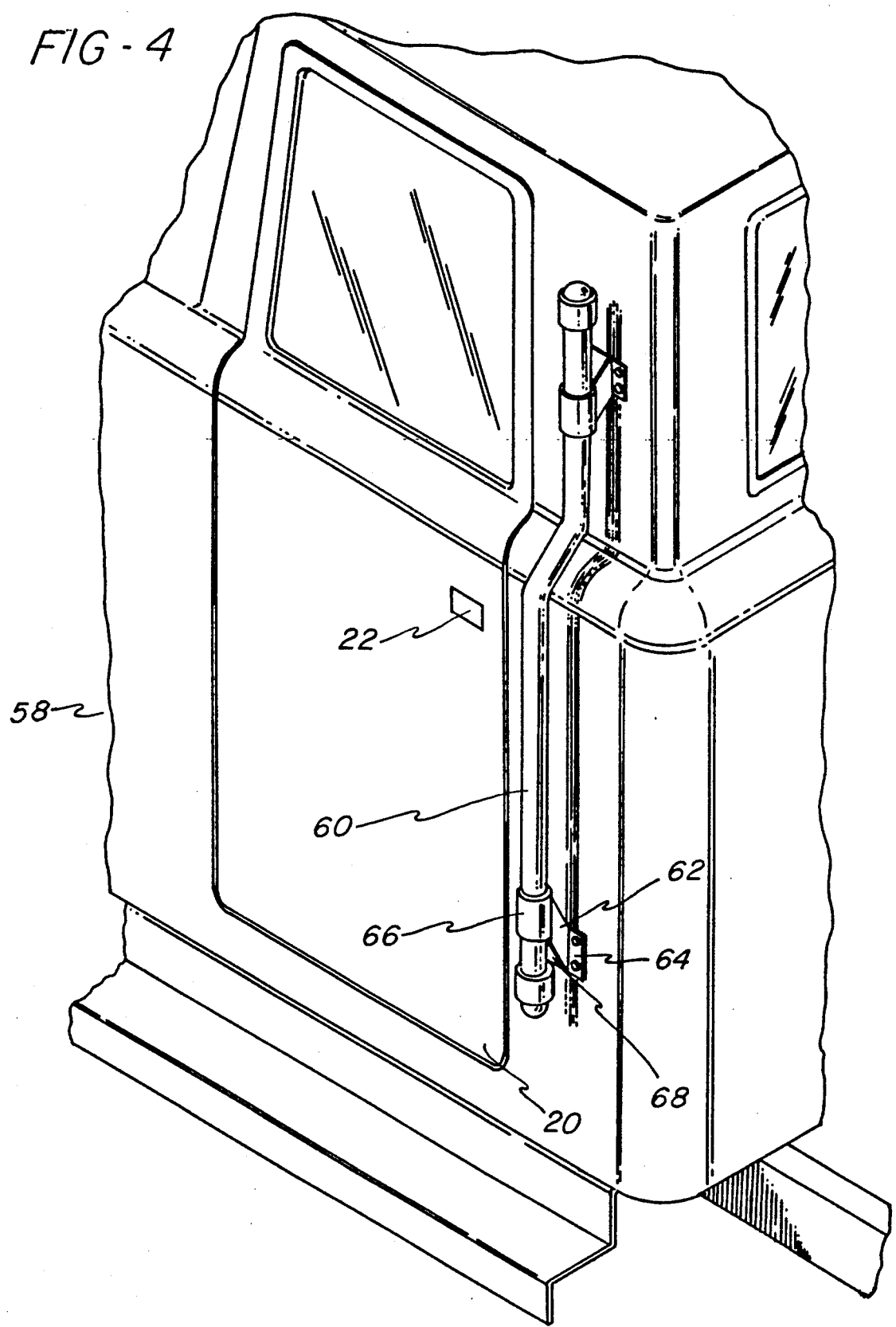

LIGHTED GRAB HANDLES FOR TRUCKS

BACKGROUND OF THE INVENTION

This invention is directed to a grab handle for use on motor vehicles, and more specifically to a grab handle having lamp means and at least one end for indicating the position of the vehicle Grab handles are, as the name implies, handles secured to a motor vehicle to assist the driver or passenger in entering or exiting of the vehicle. Normally these handles are comprised of a steel tube or handle, with means for securing such handle to the vehicle. With respect to larger motor vehicles such as trucks, the grab handles are typically secured to the outer side panels of the vehicle. These vehicles are often parked in a dimly lit area, sometimes even left running while unattended for short periods of time. In such situation there may be no source of light nearby to assist the driver or passenger in easy re-entering of the vehicle.

Thus, the need exists for a grab handle which provides a safer entrance and exit from a motor vehicle.

SUMMARY OF THE INVENTION

This invention satisfies the need for a grab handle which provides a safer entrance or exit into a motor vehicle by disclosing a grab handle for use on motor vehicles comprising a generally vertically extending gripping portion, means for attaching the gripping portion the side of a motor vehicle, and lamp means in at least one end of said handle for indicating the position of the vehicle. The lamp means preferably includes first and second lamp filaments with the first lamp filament being connected to the electrical circuitry of the vehicle responsible for supplying power to the running lamps of the vehicle and the second lamp filament being connected to the electrical circuitry to the vehicle responsible for supplying power to the turn signals of the vehicle.

The vertically extending gripping portion is configured similarly to the side of the vehicle so as to be oriented approximately parallel thereto. In one embodiment of the invention the handle is straight while in the modified embodiment the handle is curved. The handle is positioned rearwardly of the door of the vehicle and has at least a portion positioned above the door handle. The vertically extending gripping portion has two ends, both ends being closed by caps, with the caps being attached to an insert. The insert is secured to the vertically extending gripping portion. In the preferred embodiment of the invention the insert has an outer wall having a threaded portion. The cap has a threaded inner wall for engagement with the threaded portion of the insert.

There is also disclosed a multi-purpose handle for use on motor vehicles comprising a generally vertically gripping portion, a pair of brackets for attaching the gripping portion to the side of a motor vehicle in space relationship thereto and so positioned with respect to the vehicle's door to assist the operator or passenger to enter or exit the vehicle, a pair of lamps, one positioned in each end of the gripping portion, each of the lamps having a pair of filaments, means for connecting one of the lamp filaments to the electrical circuitry used to supply current to the vehicle's running lamps, and means for connecting the other of the lamp filaments to the electrical circuitry used to supply current to the vehicle's turn signals.

It is an object of the invention to provide an improved grab handle for use with motor vehicles.

Another object of the invention is to provide a multifunction grab handle which also serves as a safety light for the motor vehicle as well as an additional turn signal indicator.

These and other objects and advantages will be better understood by reference to the following description, drawings, and appended claims.

BRIEF DESCRIPTION OF THE DRAWINGS

FIG. 1 is a partial side elevational view of a pick-up truck, showing the preferred embodiment of the invention mounted thereto.

FIG. 2 is a perspective view of the embodiment of the invention shown in FIG. 1.

FIG. 3 is a vertical sectional view taken along line 3—3 of FIG. 2.

FIG. 4 discloses a modified embodiment of the invention shown mounted on a tractor trailer truck.

DETAILED DESCRIPTION OF THE INVENTION

Having reference to the drawings, attention is directed to FIG. 1 which illustrates a grab handle secured in its operative embodiment on a motor vehicle, with the grab handle being generally identified by the numeral 10. The motor vehicle 12 to which the grab handle in FIG. 1 is secured is a truck, more specifically a pick-up truck.

The motor vehicle 12 has a conventional light system 14 including head lights 15 positioned along its front 16 and auxiliary lights 17 which typically function both as parking or running lights as well as turn signal indicators, with these lights being secured along the side 18 of vehicle 12. Also shown is door 20 having a door handle 22.

As can be seen in FIGS. 1, 2 and 3, the grab handle 10 of this invention comprises a vertically extending gripping portion 25 preferably fabricated from steel, and having a generally circular cross-section. Grab handle 10 also comprises means for attaching the gripping portion 25 to the side of the vehicle. Preferably this attachment means 27 is a bracket as can be seen in drawings. The attachment means 27 is secured to the side 18 of the vehicle 12 by fastening means 30, preferably screws or bolts, however, the bracket could be welded to the vehicle. The vertically extending gripping portion 25 has ends 32 and 33 located at the opposite ends of the gripping portion. Associated with the ends 32 and 33 are lamp portions 35 and 36 respectively. Lamp portions 35 and 36 in turn each contain light bulbs 37 and 38 respectively. The light bulb used with this invention includes a first filament 39 as well as a second filament 40, with the light bulbs 37 and 38 being secured into first and second sockets 41 and 42 respectively. The sockets are shielded from water and dirt by caps 44 and 45 which provide a seal with respect to ends 32 and 33. The cap could be fabricated from metal or be made of a suitable plastic material.

As can best be seen in FIG. 3, an insert member 50 is positioned between each cap and the tubular component of the vertically extending gripping portion 25. The insert 50 is secured to the vertically extending gripping portion by suitable means, including adhesive or welding. This insert member 50 has a threaded portion 52 along at least part of its outer wall 53. Meanwhile, the caps 44 and 45 both comprise a threaded inner wall 55 thereby permitting mechanical interengagement between the insert and cap. Also shown is the electrical circuitry associated with the running light 56 and the electrical circuitry associated with the turn signal 57. The running light electrical circuitry 56 provides current to the first filament 39, while the turning signal electrical circuitry 57 provides power to the second filament 40 associated with both light bulbs 37 and 38.

FIG. 4 shows a modified embodiment of the invention for use in an alternatively constructed truck 58. The modified handle 60 is configured similarly to the side of the vehicle so as to be oriented approximately parallel thereto. However, as opposed to the preferred embodiment of the invention wherein the handle is straight, this handle can be seen as being slightly curved. FIG. 4 also shows a modified means for attaching the handle to the truck in the form of a modified bracket. This modified bracket 62 includes fastening portion 64, positioned adjacent the side of the truck 58, a gripping portion engaging portion 66 which is in contacting engagement with the vertically extending gripping portion of the modified handle 60, and a slanted connecting portion 68 which is intermediate the fastening portion 64 and the gripping portion engaging portion 66. As can be seen, one of the slanted connecting portions 68 slants upwardly between the fastening portion and engaging portion, while the other slants downwardly between the same respective components.

In actual operation, the grab handle serves a plurality of functions. In addition to providing a grab handle to assist in the entrance to or exit from a vehicle, the illumination of the first filament of the lights can serve as an indicator for the location of the grab handle to assist in embarking or disembarking at night. Additionally, when the engine is running and the vehicle is in motion, the first filament serves as a means to warn traffic or pedestrians of the presence of the vehicle, since the grab handle serves as an additional running lamp. Further, the second filament of the grab handle permits the lights to serve as additional turn signal indicators.

From the above description it will be seen that a multi-purpose grab handle is provided The invention assists in providing additional safety for the driver of a motor vehicle, in addition to assisting in the safety of pedestrians and other drivers. The embodiment of the invention is simple and cost efficient to fabricate yet provides a grab handle having an aesthetic ornamental appearance as well as a functional utility.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A grab handle for use on motor vehicles comprising
a generally vertically extending gripping portion,
means for attaching said gripping portion to the side of a motor vehicle, and
lamp means in at least one end of said handle for indicating the position of said vehicle, said lamp means including first and second lamp filaments, said first lamp filament connected to the electrical circuitry of the vehicle responsible for supplying power to the running lamps of the vehicle, said second lamp filament connected to the electrical circuitry of the vehicle responsible for supplying power to the turn signals of the vehicle.

2. The grab handle as claimed in claim 1, wherein said vertically extending gripping portion is configured similarly to the side of the vehicle, so as to be oriented approximately parallel thereto.

3. The grab handle of claim 2 wherein said handle is straight.

4. The grab handle of claim 3 wherein said handle is curved.

5. The grab handle as claimed in claim 1 wherein said handle is positioned rearwardly of the door of the vehicle, and has at least a portion of said handle positioned above the door handle.

6. A grab handle for use on motor vehicles comprising
a generally vertically extending gripping portion,
means for attaching and gripping portion to the side of a motor vehicle, and
lamp means in at least one end of said handle for indicating the position of said vehicle, said vertically extending gripping portion having two ends, both ends being closed by caps, said caps attached to an insert, said insert secured to said vertically extending gripping portion.

7. The grab handle as claimed in claim 7 wherein said insert has an outer wall, said outer wall having a threaded portion, said cap having a threaded inner wall for engaging said threaded portion.

8. A multiple purpose handle for use on motor vehicles comprising
a generally vertically extending gripping portion,
a pair of brackets for attaching said gripping portion to the side of a motor vehicle in spaced relationship thereto and so positioned with respect to the vehicle's door to assist the operator or passenger to enter or exit the vehicle,
a pair of lamps, one positioned in each end of said gripping portion,
each of said lamps having a pair of filaments,
means for connecting one of said lamp filaments to the electrical circuitry used to supply current to the vehicle's running lamps, and
means for connecting the other of said lamp filaments to the electrical circuitry used to supply current to the vehicle's turn signals.

9. The grab handle as claimed in claim 8, wherein said vertically extending gripping portion is configured similarly to the side of the vehicle, so as to be oriented approximately parallel thereto.

10. The grab handle as claimed in claim 9 wherein said handle is positioned rearwardly of the door of the vehicle, and has at least a portion of said handle positioned above the door handle.

11. The grab handle as claimed in claim 8 wherein said vertically extending gripping portion has two ends, both ends being closed by caps, said caps attached to an insert, insert secured to said vertically extending gripping portion.

12. The grab handle as claimed in claim 11 wherein said insert has an outer wall, said outer wall having a threaded portion, said cap having a threaded inner wall for engaging said threaded portion.

13. The grab handle as claimed in claim 6, wherein said vertically extending gripping portion is configured similarly to the side of the vehicle, so as to be oriented approximately parallel thereto.

14. The grab handle of claim 6 wherein said handle is straight.

15. The grab handle of claim 6 wherein said handle is curved.

16. The grab handle as claimed in claim 6 wherein said handle is positioned rearwardly of the door of the vehicle, and has at least a portion of said handle positioned above the door handle.

17. The grab handle as claimed in claim 8 wherein said handle is positioned rearwardly of the door of the vehicle, and has at least a portion of said handle positioned above the door handle.

* * * * *